United States Patent [19]

Schuchman

[11] Patent Number: 4,781,496

[45] Date of Patent: Nov. 1, 1988

[54] TOOL AND METHOD FOR RESURFACING A HOUSING

[75] Inventor: Oscar R. Schuchman, Cincinnati, Ohio

[73] Assignee: Cincinnati Milacron Inc., Cincinnati, Ohio

[21] Appl. No.: 922,374

[22] Filed: Oct. 23, 1986

[51] Int. Cl.$^4$ .............................................. B23B 41/00
[52] U.S. Cl. .................................. 408/1 R; 29/402.06;
82/42; 408/192; 408/224
[58] Field of Search ............... 408/189, 191, 192, 193,
408/194, 195, 196, 197, 198, 223, 224, 225, 227,
233, 82, 203.5, 186, 713, 1 R; 409/236; 82/2 A,
4 R; 29/402.01, 402.02, 402.06, 402.08

[56] References Cited

U.S. PATENT DOCUMENTS

| 195,100 | 11/1877 | Doiley | 408/198 |
|---|---|---|---|
| 640,751 | 1/1900 | Corwin | 82/4 R |
| 790,735 | 5/1905 | Martin . | |
| 1,048,378 | 12/1912 | Upham | 408/186 |
| 1,876,621 | 9/1932 | Crute | 82/4 R |
| 2,115,430 | 4/1938 | Schley et al. | 82/4 R X |
| 2,157,375 | 5/1939 | Wiessner | 82/4 R |
| 2,546,292 | 8/1946 | Bell | 30/310 |
| 3,365,988 | 1/1968 | Kerlan | 408/198 |
| 3,673,656 | 7/1972 | Gerchow | 408/203.5 |
| 3,772,944 | 11/1973 | Becker et al. | 82/4 C |
| 4,533,285 | 8/1985 | Jorgensen | 408/191 |

FOREIGN PATENT DOCUMENTS 2359670  2/1978  Fed. Rep. of Germany ...... 408/225

Primary Examiner—Z. R. Bilinsky
Attorney, Agent, or Firm—Daniel P. Worth

[57] ABSTRACT

The present invention includes a tool and method for resurfacing a housing facing. The tool is adapted for use with a rotatable shaft extending from a housing, e.g. an impeller shaft of a pump. The tool includes a body having first and second halves that are removably secured to the rotatable shaft. A plurality of cutters are receivable within slots selectively disposed along the radii of the body halves. Advancing and locking screws for each cutter are utilized to position a cutter for engagement with the housing facing. The shaft is rotated, causing the cutters to produce a cut of desired depth in the facing. The depth of the cut is increased by turning an advancing screw.

10 Claims, 4 Drawing Sheets

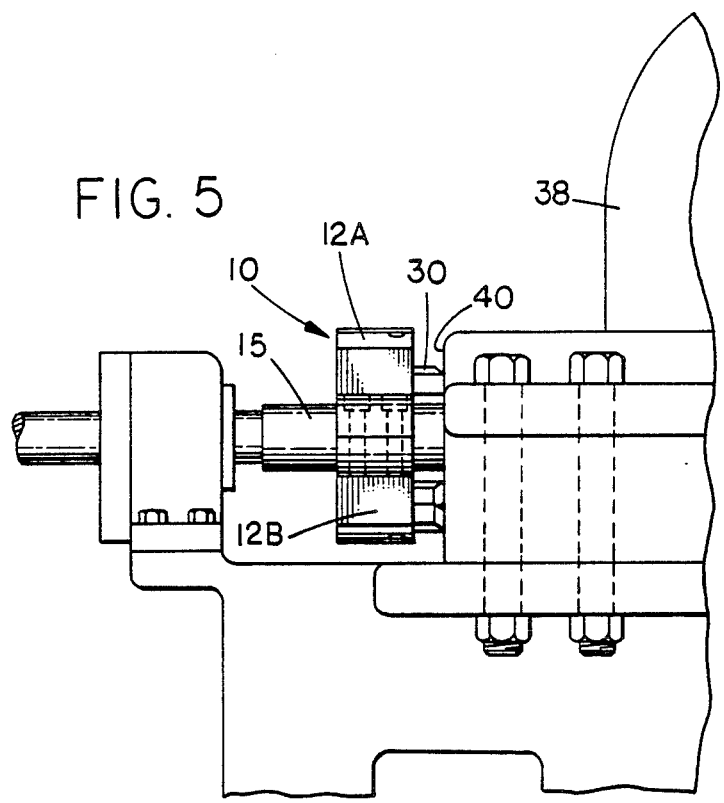
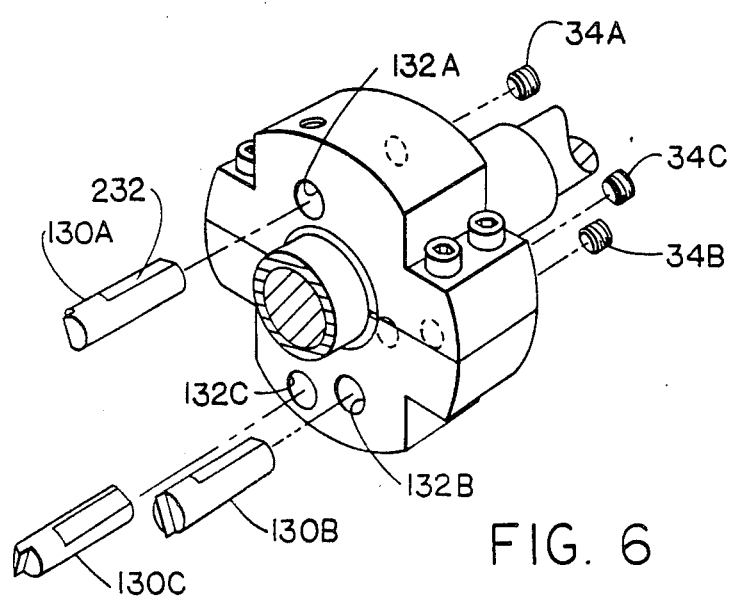

TOOL AND METHOD FOR RESURFACING A HOUSING

BACKGROUND OF THE INVENTION

1. Field of the Invention.

The present invention relates generally to cutting devices, and more particularly is concerned with a tool for resurfacing a facing of a housing adjacent a rotatable shaft.

2. Description of the Related Art.

Leakage often occurs in seals on pumps. Many pumps in operation employ "stuffing box" packing between the pump body and the rotatable impeller shaft. When leakage occurs, corrosion and pitting often attack the housing facing, rendering the area more difficult to seal. In addition, friction caused by the packing mass between the rotating shaft and the pump housing reduces the efficiency of the pump and causes fretting on the rotating member.

It is desirable to replace stuffing box packing with mechanical seals. Mechanical seals provide two important advantages over stuffing box packing. First, loss of product which normally leaks past stuffing box packing is prevented. Second, friction loss caused by packing mass is substantially reduced, thereby improving the efficiency of the pump. Generally, mechanical seals include O-rings and are installed about the impeller shaft adjacent the outside facing of a pump housing. The installation of a mechanical seal requires that the face of the pump housing be clean, flat and perpendicular to the rotating shaft to ensure an effective seal between the stationary face and rotary face of the mechanical seal.

Frequently, proper conversion of a pump to a mechanical seal from packing mass requires resurfacing of the facing to remove corrosion, pitting and other surface irregularities. Previously, two methods were employed for performing the resurfacing. First, a pump was removed from its foundation and sent to a machining shop. This method is undesirable since it is expensive and involves rigging, transportation and decoupling of the pump. Decoupling of the pump is particularly undesireable, since realignment and recoupling is a time-consuming procedure which can last for days. The pump can be out of service for extended periods of time. Second, resurfacing was performed on site with cutting and grinding equipment. While the down time of a pump is usually shorter, equipment and labor costs are generally very expensive for this operation.

Both manual and automatically driven cutting tools have been known in the art for quite some time. A manual gasket cutter is shown in U.S. Pat. No. 1,670,628 issued to Mahin in 1928. Cutters are radially adjusted to provide a cut of desired diameter. Other examples of manual cutting tools include U.S. Pat. Nos. 790,735; 1,413,920 and 2,546,292.

An automatically driven flange facing machine is shown in U.S. Pat. No. 3,762,246 issued to Becker in 1973 and U.S. Pat. No. 3,772,944 issued to Becker et al. in 1973. The machine includes a base that is mounted in the base of a pipe or valve to provide accurate alignment of a lathe tool with a flange face. The lathe tool is rotated by a power means to cut the flange face.

A cutting attachment is shown in U.S. Pat. No. 4,533,285 issued to Jorgensen in 1985. The attachment includes a collar which is insertable on the shaft on a boring tool. The collar includes a cutter for cutting a chamfer around the bore produced by the boring tool. The cutter can be adjusted to produce a desired chamfer. However, the cutter can not be adjusted to produce an axial cut in a surface away from the bore.

Consequently, a need exists for improvements in resurfacing a housing facing adjacent a rotatable shaft. It is desirable to have a tool which can perform the resurfacing operation without decoupling a pump, disturbing the shaft alignment or removing it from its foundation. Such a tool should include means for selectively varying axial cuts in facing along a radial area about the shaft. It is desirable that an improved tool be inexpensive to manufacture and easy to operate.

SUMMARY OF THE INVENTION

The present invention provides a tool and method for resurfacing the facing on a housing. The present tool can be utilized without removal of the housing from its foundation. The present tool is inexpensive to manufacture, and its use requires no more than ordinary shop tools. The present tool is constructed to be easily adaptable to various size shafts of various types of equipment having a rotatable shaft.

In a preferred embodiment, the present invention includes a tool and method for resurfacing a housing facing. The tool is adapted for use with a rotatable shaft extending from a housing, e.g. an impeller shaft of a pump. The tool includes a body having first and second halves that are removably secured to the rotatable shaft. A plurality of cutters are receivable within slots selectively disposed along the radii of the body halves. Advancing and locking screws for each cutter are utilized to position a cutter for engagement with the housing facing. The shaft is rotated, causing the cutters to produce a cut of desired depth in the facing. The depth of the cut is increased by turning an advancing screw.

In accordance with another aspect of the invention, the cutters are aligned so that the cutting paths of adjacent cutters overlap one another to provide a cumulative cutting path of desired width on the facing.

BRIEF DESCRIPTION OF THE DRAWINGS

Other features and advantages of the present invention will become more fully apparent from the following detailed description of the preferred embodiment, the appended claims and the accompanying drawings in which:

FIG. 5 is a side elevational environmental view of the present resurfacing tool mounted on the impeller shaft of a pump.

FIG. 6 is a perspective view of the present invention illustrating an alternate embodiments of the cutters.

Reference will now be made in detail to the present preferred embodiment of the invention, an example of which is illustrated in the accompanying drawings.

DETAILED DESCRIPTION OF THE PREFERRED EMBODIMENTS

A preferred embodiment of the tool of the present invention is indicated generally at 10 in FIGS. 1-5. The tool 10 includes an upper or first body half 12A and a lower or second body half 12B. Body halves 12A and 12B include central aligning grooves 14A and 14B, respectively, for receiving a rotatable shaft 15. When the body halves 12A and 12B are assembled, grooves 14A and 14B form a central bore for receiving shaft 15. An upper or first bushing half 16A and a lower or second bushing half 16B are selected and installed between the shaft 15 and the body halves 12A and 12B, respectively, to provide a snug fit of the tool 10 on the shaft 15.

In many pumps the shaft 15 has a brass sleeve 15X pressfitted on it where the shaft runs through the packing or stuffing box. Sleeve 15X takes up any wear resulting from the constant rubbing against the packing in the stuffing box, thus preserving the shaft.

Retainer means in the form of four allen-head screws 18A-18D removably interconnect the body halves 12A and 12B. Screw openings 20A-20D (20B is not illustrated in the FIGS.) in flanges 22A and 22B of the upper body half 12A align with screw openings 24A-24D and flanges 26A and 26B of the lower body half 12B. Screws 18A-18D are inserted into respective openings 20A-20D and threaded into respective openings 24A-24D. Of course, other fasteners and arrangements for removably securing the body halves 12A and 12B about shaft 15 are within the scope of the present invention.

Cutters 30A-30C are provided in the body halves 12A and 12B. Each cutter 30A-30C is a longitudinal member having a cutting edge 31A-31C at one end. Each cutter 30A-30C is received in a respective slot 32A-32C in a body half 12A and 12B. It is preferred that each cutter 30A-30C and slot 32A-32C be of rectangular cross section. However cutters of other cross sections and corresponding slots can be used if desired.

Figure 2:
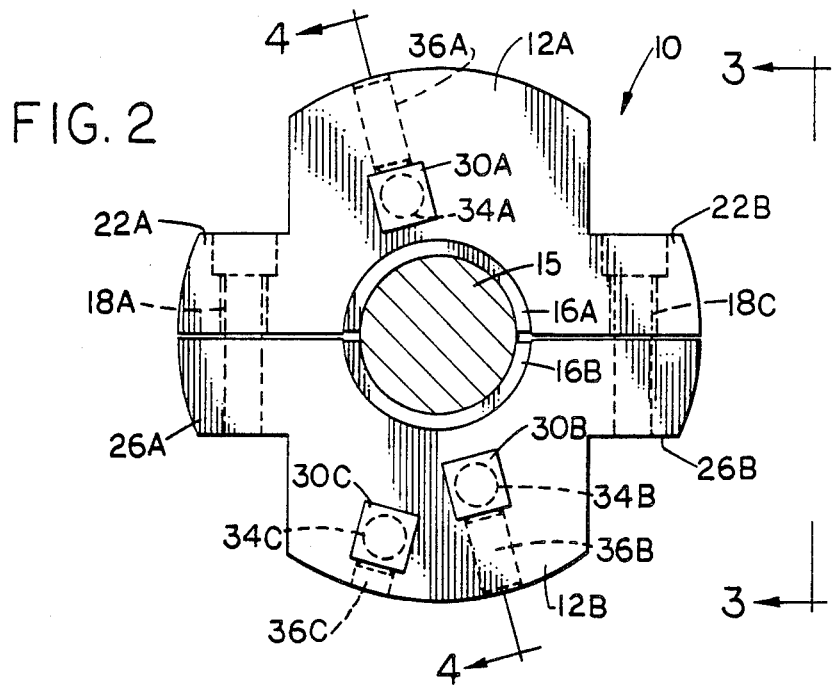
FIG. 2 is an assembled left end view of the present resurfacing tool of FIG. 1.
Figures 3, 4:
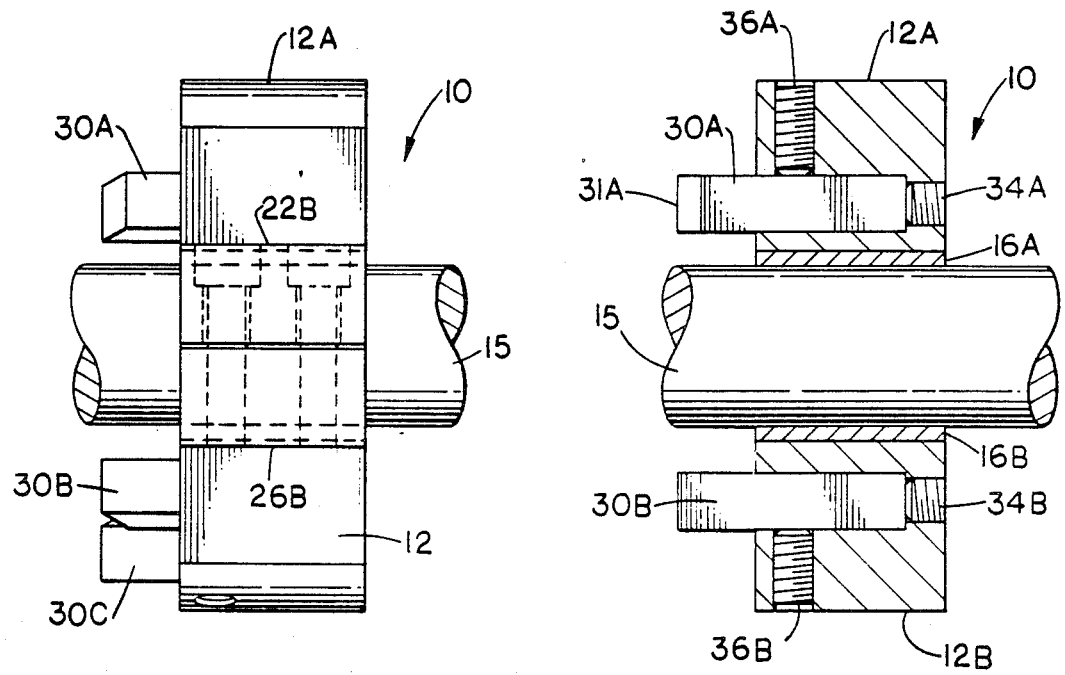
FIG. 3 is a right side elevational view of the tool of FIG. 2.
FIG. 4 is a view taken along line 4—4 of FIG. 2.

As illustrated best in FIGS. 2-4, the slots 32A-32C are located at varying positions along the radii of the body halves 12A and 12B. The slots 32A-32C are selectively spaced on the body halves 12A and 12B so that the cutting paths of cutters 30A-30C overlap on the face of a housing as described below. As illustrated best in FIG. 2, slot 32C is the farthest from the center of shaft 15, while slot 32A is the closest to the center of shaft 15.

Figure 1:
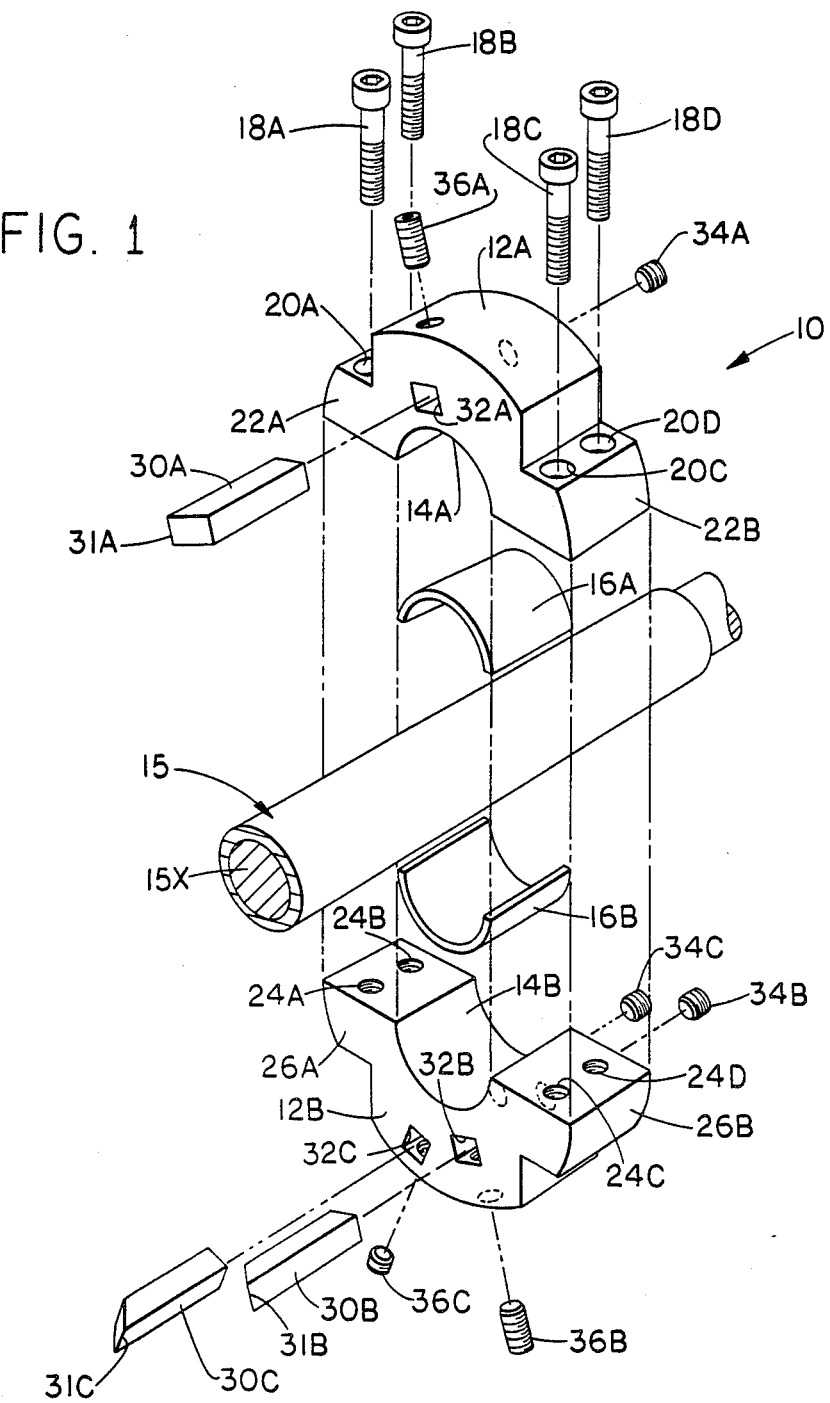
FIG. 1 is an exploded perspective view of a preferred embodiment of the resurfacing tool of the present invention.

As illustrated best in FIGS. 1 and 5, a first or advancing screw 34A-34C is threaded into each slot 32A-32C opposite the respective cutting edges 31A-31C. Each screw 34A-34C is aligned along the longitudinal axis of its respective cutter 30A-30C. As the screws 34A-34C are turned, the cutters 30A-30C are advanced parallel with shaft 15 in the slots 32A-32C to a desired position. A second or locking screw 36A-36C is threaded into the appropriate body half 12A and 12B perpendicular to each cutter 30A-30C. Screws are turned to engage the cutters 30A-30C and lock them in a desired position in their slots 32A-32C.

In a preferred operation of the tool 10, cutters 30A-30C are inserted into their respective slots 32A-32C. Advancing screws 34A-34C and locking screws 36A-36C are backed away from the cutters 30A-30C. Bushing halves 16A and 16B and body halves 12A and 12B are radially mounted on the rotatable shaft 15 of a pump 38, for example, as illustrated in FIG. 5. The body halves 12A and 12B are positioned on the shaft 15 so that cutting edges 31A-31C are directed toward housing facing 40 of pump 38. Screws 18A-18D are inserted into screw openings 20A-20D and threaded into screw openings 24A-24D to removeably lock the body halves 12A and 12B on shaft 15.

The outermost cutter 30C from the center of the body halves 12A and 12B is advanced by advancing screw 34C so that cutting edge 31C is urged into contact with the facing 40. Cutter 30C is then locked into position by locking screw 36C. Shaft 15 is rotated in its usual direction of rotation and so that cutting edge 31C creates a cutting path on the facing 40, removing corrosion and other undesirable material. Shaft 15 can be rotated manually, for example, by a chain wrench. Screw 34C is turned to select the depth of the axial cut (i.e. parallel with shaft 15) on facing 40. Rotation of the shaft 15 is continued until a desired smooth cut is provided on the facing 40. Use of the tool 10 does not require high-speed rotation, thereby reducing the risk of flying debris from the facing 40.

Figure 9:
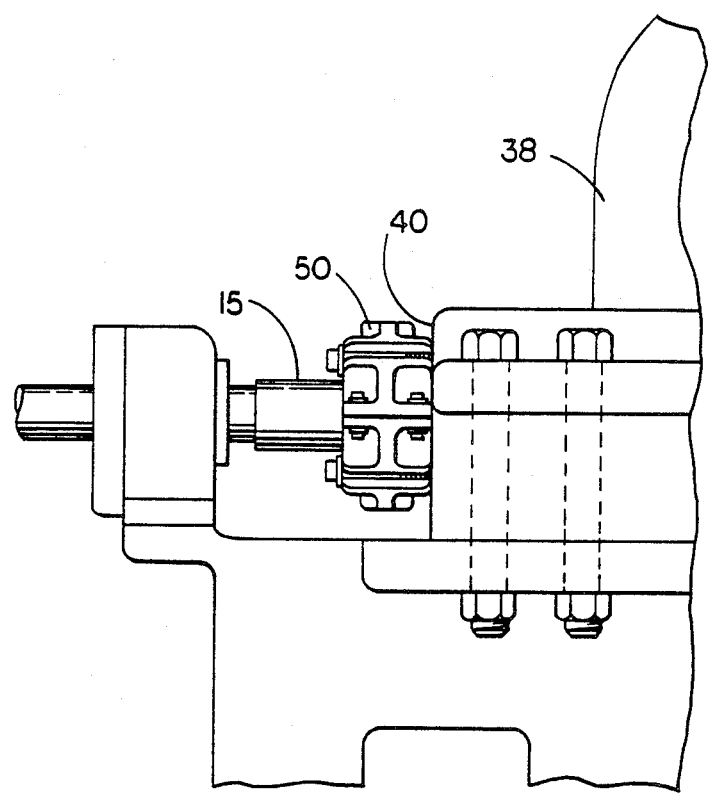
FIG. 9 is a side elevational environmental view of a split mechanical seal installed adjacent a housing after the resurfacing tool has been removed.

Once a desired cut is performed by cutter 30C, it is backed away from facing 40 by loosening screws 34C and 36C. Then, cutter 30B, the next successive cutter towards the center of the body halves 12A and 12B, is advanced and locked by screws 34A and 34B so that cutting edge 31B is urged into contact with the facing 40. Shaft 15 is rotated so that cutter 34B provides a desired cutting path on the facing 40. The cutting path of cutter 30B overlaps the cutting path of cutter 30C. This procedure is continued for cutter 30A to produce a desired axial cutting path on the facing 40. Once the cutting path is achieved, the tool 10 is removed from the shaft 15. The resurfacing on the facing by tool 10 permits installation of a selected split mechanical seal 50, illustrated in FIG. 9. The resurfacing operation can be performed without disturbing the alignment or coupling of a pump.

Various embodiments of the present tool 10 are easily envisioned. For example, a single cutter could replace the three cutters 30A-30C described above. Alternatively, 180° opposed cutters on equal radii or exerting roughly equal moments as torque minimize cocking under load. Of course, a wider cutting path and a deeper cut on the facing 40 require more force for turning shaft 15. Therefore, an advantage in using a plurality of cutters 30A-30C is that less force is required for rotating the shaft 15. It is desireable to manually rotate the shaft 15, eliminating the need for power equipment. The preferred embodiment of the tool 10 illustrated in FIGS. 1-5 can be used to resurface a housing without the use of power equipment to rotate the shaft 15.

Other screws and fasteners can be utilized to secure the body halves 12A and 12B to the shaft 15. Other screw arrangements can be utilized to advance and lock the cutters 30A-30C. While the tool 10 is shown mounted to a pump shaft 15 in FIG. 5, the tool 10 can be utilized with other equipment having a rotatable shaft adjacent a housing, such as mixers and agitators.

Figure 7:
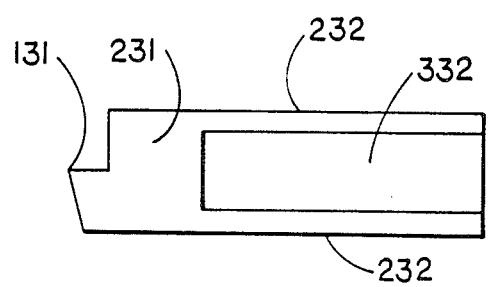
FIG. 7 is a side elevational view of a cutter illustrated in FIG. 6.
Figure 8:
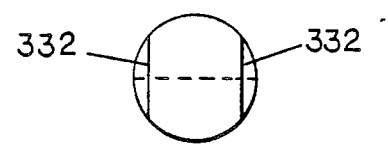
FIG. 8 is a right end view of the cutter of FIG. 7.

FIGS. 6, 7 and 8 illustrate an alternative embodiment wherein body halves 12A and 12B have round cutter holes 132A, 132B, and 132C bored or drilled therein to snugly receive respective flatted round cross section cutters 130A, 130B, and 130C. The round holes 132A, 132B and 132C may be drilled or bored and hence are easier to shape than the rectangular slots 32A, 32B and 32C described above, which require broaching to fabricate. The cutters 130A, 130B and 130C in FIG. 6 are made from commercially available round cutter stock. As illustrated best in FIGS. 7 and 8, each cutterbase 232 has two sets of screw flats 332 on opposite sides so that respective locking screws 36A, 36B and 36C can readily secure a cutter in place in its respective hole. A pair of flats 332 is provided so that a bit 131 can be mounted in either direction depending upon the direction of shaft rotation. The cylindrical portion of a round cutter designated 231 cooperates with the remaining round or cylindrical segments 232 of the cutter base to fit and align with respective round holes 132A, 132B and 132C. Bit 131 and flats 332 must be aligned when the tool 10 is made to assure the proper relation so that the edge 131 is correctly positioned to cut for the selected direction of rotation.

A stepped surface can be made or refaced by setting cutters at different depths at different radii.

By similar techniques, the stuffing box about a connecting rod or reciprocating equipment may be repaired by refacing or even lightly reboring the cylindrical chamber of the box if it is corroded. Reciprocating steam engines and pumps exemplify such structures. However, the body halves 12A and 12B of the tool 10 must be mounted to rotate or swing about the shaft, e.g. by shimming between flanges 22A, 22B and 26A and 26B.

Although the present invention has been described with reference to preferred embodiments, workers skilled in the art will recognize that changes may be made in form and detail without departing from the spirit and scope of the invention.

What is claimed is:

1. A method of resurfacing a pump housing facing in situ to accept a seal for a rotatable shaft extending substantially perpendicularly from the housing, the method comprising the steps of:
    (a) removably securing about the rotatable shaft a body having a first half and a second half and at least three selectively engageable cutting members being positioned in the body at different radial locations from the shaft;
    (b) adjusting one of the cutting members to engage the facing at a desired depth;
    (c) rotating the body and shaft so that the one of the cutting members produces a cutting path on the facing; and
    (d) iterating steps (b) and (c) to cause the other cutting members to produce cutting paths on the facing, thereby producing a finished surface on the facing for accepting the seal.

2. The method of claim 1 further comprising the step of locking the one of the cutting members into a fixed position relative to the body after the step of adjusting the one of the cutting members to selectively engage the facing at a desired depth.

3. The method of claim 1 further comprising the steps of:
    (a) unlocking the one of the cutting members after rotating the shaft; and
    (b) backing the one of the cutting members away from the cutting path on the facing.

4. A resurfacing tool for resurfacing a pump housing facing in situ to accept a seal for a rotatable shaft extending substantially perpendicularly from the housing, said tool comprising:
    (a) a body having a first half and a second half, each body half having a central semicylindrical groove for receiving a portion of the rotatable shaft;
    (b) means for removably securing the body halves to each other about the rotatable shaft;
    (c) at least three slots in said body parallel to the central groove, each slot having a different fixed radial position from the groove such that the rotational projection of the slots on the pump housing facing provides three overlapping circular paths covering the area of the facing to be resurfaced;
    (d) a plurality of of cutting members receivable in said slots; and
    (e) means for selectively engaging each of the cutting members with the housing facing whereby the cutting members may be independently and sequentially engaged with the housing facing to produce a finished surface for accepting the seal.

5. The tool as specified in claim 4 and further comprising a first bushing half inserted in the groove of the first body half to be between the shaft and the first body half when the body half is mounted on the shaft and a second bushing half inserted in the groove of the second body half to be disposed likewise between the shaft and the second body half.

6. The tool as specified in claim 4 wherein:
    (a) each body half includes at least one flange extending from its outer surface, the flange of the first body half being constructed and arranged to align with the flange of the second body half; and
    (b) said means for removably securing includes at least one fastener interconnecting the flanges to removably secure the body halves to the rotatable shaft.

7. The tool as specified in claim 4 wherein the means for selectively engaging each cutting member with the housing facing comprises for each slot
    (a) a first screw threaded into said body and aligned with its respective slot and along the longitudinal axis of each cutting member for urging the cutting member towards the housing facing; and
    (b) a second screw threaded into the body half and aligned perpendicular to the longitudinal axis of each cutting member for locking the cutting member in place in its slot.

8. The tool as specified in claim 4 wherein each cutting member and slot has a rectangular cross section.

9. The tool as specified in claim 4 wherein each cutting member and slot has a circular cross-section.

10. The tool as specified in claim 9 wherein each cutting member includes a pair of flatted parallel longitudinal side sections located on opposite sides of the cutting member where said second screw may engage one of said side sections.

* * * * *